G. L. BUNKER.
VEHICLE WHEEL.
APPLICATION FILED SEPT. 3, 1920.

1,410,452.

Patented Mar. 21, 1922.

Inventor:
Gerald L. Bunker
by Gerald L. Bunker.

UNITED STATES PATENT OFFICE.

GERALD L. BUNKER, OF LA GRANGE, ILLINOIS.

VEHICLE WHEEL.

1,410,452.  Specification of Letters Patent.  Patented Mar. 21, 1922.

Application filed September 3, 1920. Serial No. 407,973.

*To all whom it may concern:*

Be it known that I, GERALD L. BUNKER, of La Grange, Cook County, Illinois, have invented certain new and useful Improvements in Vehicle Wheels, of which the following is a specification.

The object of this invention is to devise a simple, practical and serviceable wheel for trucks, automobiles, and other vehicles, and the invention consists in the features of construction and combination of parts hereinafter set forth and claimed.

Figure 1:
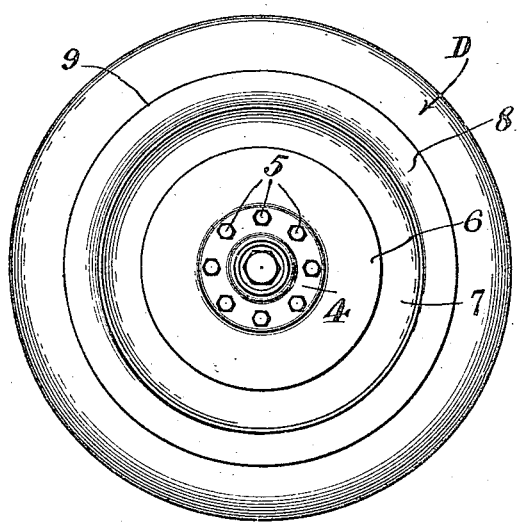
Figure 2:
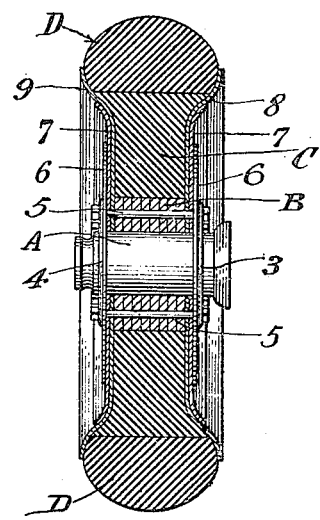

An embodiment of my invention is exhibited in the accompanying drawing in the manner following:

Figure 1 is a side elevation of a vehicle wheel wherein the present improvements are incorporated; and Fig. 2 is a transverse section taken centrally therethrough.

The principal parts of the present wheel include a hub A surrounded by a sleeve B which lies interiorly of the wheel body designated as C. A tire D surrounds the wheel body, its retention thereupon being accomplished by the means presently to be described.

The hub assembly comprises a fixed flange 3 and a second flange 4 connected therewith as by bolts 5 extending through the sleeve B which, as shown, may consist of a plurality of disks. Interposed between the sleeve end and each proximate hub flange are three disks or circular plates 6, 7, and 8 of unequal diameter, and designated by these numerals in the order of their respective positions commencing with the outside of the wheel. As shown the disk 6 which occupies an outermost position presents its periphery adjacent the middle region of the wheel body; the intermediate disk 7 by preference extends close to the periphery of the wheel body; while the inner disk 8 extends beyond the wheel body to provide at 9 a retaining flange for the tire D. The two inner disks are shown to be flared outwardly, as is also the wheel body, in the region of their respective peripheries so as to provide a tread, of which the tire is a part, that is appreciably wider than is the wheel body elsewhere. By means of the connecting bolts 5 the several parts of my wheel are retained in assembled relation so as to function properly in service.

In the manufacture of my improved wheel the hub and its flanges may be formed of metal of a suitable kind. The sleeve surrounding the hub may advantageously be formed of wood or some material that satisfactorily answers the requirements of this part. The several disks, however, are preferably formed from spring metal such as to yield or flex laterally under strain. The wheel body which is confined between these yielding sets of disks may, if desired, be made of rubber as is also, by preference, the tire, but in this case the latter, in order to possess the necessary wearing properties, should be harder than the wheel body. In this manner the tire and body together constitute a unitary cushion element for the wheel. Due to the provision of the yielding disks at each side of the wheel body, displacement thereof in a lateral direction is provided for but only within the definite limits afforded by the resistance of these disks.

It is desirable, although not essential, that several spring disks should be grouped together for added strength, the same as several leaves are commonly utilized for a single spring. In this manner added yieldability is obtained without loss of strength. In various of its features my invention herein described is susceptible of modification without departing from the underlying principles defined in the claims below, and accordingly I desire that such changes or modifications be included within the scope of this patent.

I claim:

1. In a wheel, the combination of a hub, a flange secured thereto, a second flange on the hub, a sleeve surrounding the hub between the two flanges, a body for the wheel mounted on the sleeve, a tire associated with the body, spring plates arranged adjacent each hub flange and opposite sides of the wheel body and tire, and means for retaining these several parts in assembled relation comprising bolts extending transversely between the hub flanges and through the plates and sleeve, substantially as described.

2. In a wheel, the combination of a hub, a resilient wheel body associated therewith, means for centering the hub relative to the body, spring means associated with the hub and bearing against opposite sides of the body, and a tire mounted on the body, said spring means acting also as a retainer for the tire, substantially as described.

3. In a wheel, the combination of a hub, a wheel body associated therewith, multiple spring means associated with the hub and bearing against opposite sides of the body, a tire mounted on the body, and a single element from each multiple spring means extending beyond the wheel body to provide a retainer for the tire, substantially as described.

4. In a wheel, the combination of a hub, a rubber wheel body associated therewith, means for centering the hub relative to the body, a tire surrounding the body and mounted thereon, and springs means associated with the hub and clamped against opposite sides of the wheel body and tire acting to maintain the several parts in assembled relation, substantially as described.

5. In a wheel, the combination of a hub, a sleeve surroundnig the hub, a yieldable wheel body surrounding the sleeve, and means for uniting the several parts comprising spring plates arranged on either side of the wheel adjacent the body and sleeve, means adjacent each set of plates carried by the hub, and other means connecting the same with the sleeve and spring plates, substantially as described.

In witness whereof, I hereunto subscribe my name, this 31st day of August, A. D., 1920.

GERALD L. BUNKER.

Witnesses:
 FLORENCE NYLEN,
 BENJ. T. HAUGEN.